United States Patent [19]
Kanow

[11] Patent Number: 5,211,847
[45] Date of Patent: May 18, 1993

[54] DENITRIFICATION METHODS

[75] Inventor: Peter E. Kanow, Richmond, Va.

[73] Assignee: Infilco Degremont Inc., Richmond, Va.

[21] Appl. No.: 915,540

[22] Filed: Jul. 20, 1992

Related U.S. Application Data

[62] Division of Ser. No. 688,472, Apr. 22, 1991.

[51] Int. Cl.$^5$ .................................................. C02F 3/04
[52] U.S. Cl. .................................... 210/610; 210/615; 210/618; 210/903
[58] Field of Search ............... 210/605, 610, 615–618, 210/620, 630, 903, 793, 797, 798

[56] References Cited

U.S. PATENT DOCUMENTS

| | | | |
|---|---|---|---|
| 4,179,374 | 12/1979 | Savage et al. | 210/903 |
| 4,253,947 | 3/1981 | Fan et al. | 210/610 |
| 4,279,753 | 7/1981 | Nielson et al. | 210/605 |
| 4,756,831 | 7/1988 | Menzel et al. | 210/617 |
| 4,876,288 | 10/1989 | Herding et al. | 210/618 |
| 4,970,000 | 11/1990 | Eppler et al. | 210/605 |
| 5,006,251 | 4/1991 | Takeishi et al. | 210/618 |
| 5,049,266 | 9/1991 | Götz et al. | 210/903 |
| 5,061,368 | 10/1991 | Tada et al. | 210/903 |

*Primary Examiner*—Thomas Wyse
*Attorney, Agent, or Firm*—Carroll F. Palmer

[57] ABSTRACT

An improved multi-stage treatment system for biological denitrification of and suspended solids removal from water includes a biological reactor containing rigid media supporting denitrifying bacterial growths, an aeration chamber and an automatic backwash filter. In use, methanol or other carbon source containing influent water flows into the reactor beneath the rigid media and upwardly in contact with said bacterial growths to cause nitrates and nitrites contained therein to be converted into nitrogen. The denitrified water is then aerated in the aeration chamber and subsequently filtered by downward flow through the automatic backwash filter.

4 Claims, 5 Drawing Sheets

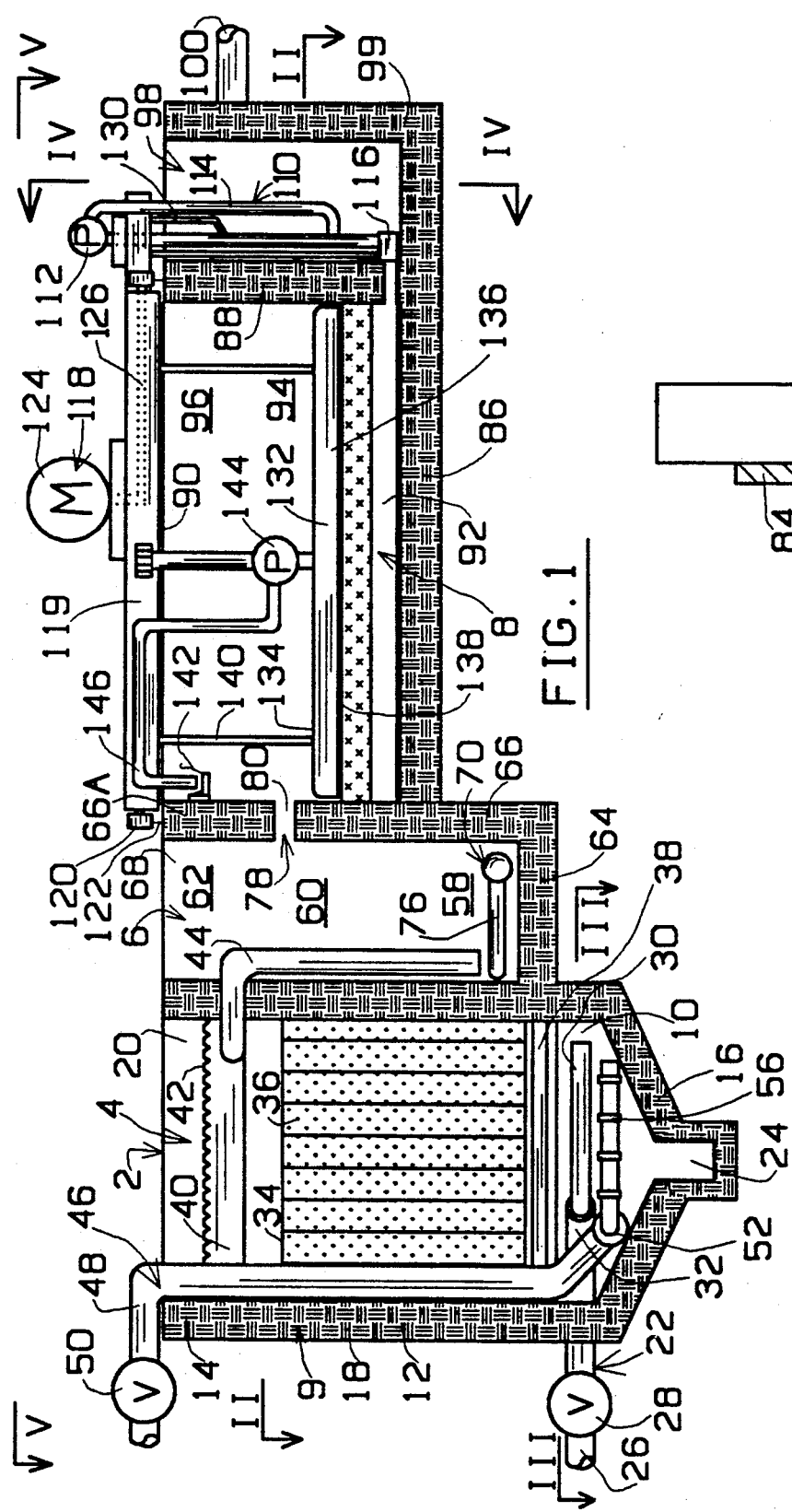
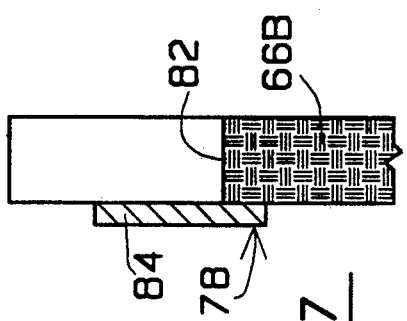
FIG. 1
FIG. 7

DENITRIFICATION METHODS

REFERENCE TO RELATED APPLICATION

This application is a division of copending application Ser. No. 07/688,472, filed Apr. 22, 1991.

BACKGROUND OF THE INVENTION

1. Field of the Invention

This application relates generally to systems and methods for the purification of water. More particularly, it concerns effective removal of nitrogen compounds and suspended solids from wastewater treatment plant secondary effluents, especially when the nitrogen is predominantly in the nitrate or nitrite form.

2. Description of the Prior Art

With increasing concern over the quality of lakes, rivers and like national, state and municipal water bodies, it has become of critical importance to substantially reduce the level of nitrogen in wastewater effluents that are being discharged in a manner that is destructive to such water bodies. Limits on nitrogen content of such effluents have become necessary to prevent eutrophication and fish kills. Nitrogen is a fertilizer and promotes the growth of aquatic weeds, grasses, and algae. It can also deplete the dissolved oxygen levels in receiving waters, a situation that is toxic to aquatic life.

The concern over the discharge of nitrogen and research and development efforts to control this discharge began in the late 1960's. Discharge limits for nitrogen content in effluent water discharge generally range from 3 to 10 mg/l, with more recent requirements frequently being less than 3 mg/l.

Typically, after conventional primary and secondary treatment, including nitrification, up to about 30% of the nitrogen content has been eliminated and the remainder converted to nitrates and nitrites. These nitrate and nitrite compounds must be eliminated with further advanced wastewater treatment. There have been many processes used in the past for removing the remaining nitrogen compounds, including ion-exchange, suspended growth systems, fluidized bed systems, expanded bed systems, and biological denitrification. This latter process uses micro-organisms to reduce nitrate and nitrite nitrogen into nitrogen ($N_2$), nitrous oxide ($N_2O$), or nitric oxide (NO).

In addition to nitrogen removal (NR), it has become necessary to reduce the total suspended solids (TSS) further, beyond secondary treatment, before discharging into convenient water bodies. Such final nitrogen and suspended solids reduction falls under the category of tertiary treatment.

Another type of denitrification system frequently used is a suspended growth reactor. It can be used as a separate denitrification system, following the nitrification stage, with methanol or other carbon source (see U.S. Pat. No. 3,709,364). Suspended growth reactors, with high recycle rates, can also be used for combined carbon oxidation-nitrification-denitrification systems, using wastewater instead of methanol as a carbon source. All suspended growth systems require clarifiers and recycle pumps for biomass return, so this increases their cost significantly. Recycle rates will range from 1-2:1 for a separate stage to 5-10:1 for the combined system.

OBJECTS

A principal object of the invention is the provision of improved multi-stage systems and methods for treatment of water for biological denitrification and suspended solids removal.

Further objects include the provision of:

1. Such systems and methods that perform with better operational control and more consistent treatment of water those available heretofore.

2. Biological denitrification systems for water treatment that are of relatively low profile thereby reducing potential pumping costs and enable them to be used to retrofit existing treatment plants where hydraulic head may be limited.

3. Such systems that enable initial capital and construction costs to be held to a minimum where denitrification is not immediately required.

4. Biological denitrification systems and methods wherein generated nitrogen bubbles are effectively discharged into the ambient by means of water circulation.

5. Biological water denitrification systems that allow a reduction in the size of the treatment equipment because they can handle higher nitrogen levels than previous systems used for this final denitrification step.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a multistage system for the effective reduction of nitrogen compounds and suspended solids comprising a fixed film biological reactor and an automatic backwash filter that fits into a typical wastewater treatment plant as shown in the schematic diagram of FIG. 8.

Methanol, or another type of carbon donor, is fed ahead of the biological reactor to provide the carbon necessary for the denitrifying bacteria in the reactor. Methanol is normally the preferred source for the carbon and approximately 3 pounds of methanol is typically fed per pound of nitrate-nitrogen. The denitrifying reaction takes place under anoxic conditions, basically no free oxygen. The dissolved oxygen content should not be more than a few tenths mg/l for the most rapid and complete denitrification. The denitrification is a two or three step reaction where the nitrates and nitrites are eventually reduced to nitrogen gas. A simplified denitrification reaction is as follows:

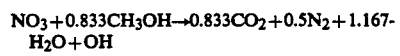

$$NO_3 + 0.833 CH_3OH \rightarrow 0.833 CO_2 + 0.5 N_2 + 1.167 H_2O + OH$$

The bacteria in the reactor require oxygen to thrive and, in the absence of free oxygen, the bacteria utilize the molecular oxygen available from the nitrate ($NO_3$) and nitrite ($NO_2$) compounds in the wastewater.

The influent water to be treated flows into a bottom distribution system through a series of pipes branching across the biological reactor. The flow is then up through a media system which supports the denitrifying bacterial growths. The media configuration provides continuous and uniform horizontal redistribution of the flow. As the flow passes through the bacteria, the denitrifying reactions occur. The upward movement of the flow also carries the nitrogen gas bubbles up to the surface of the media and out to the atmosphere. The flow cascades over weirs or collector pipes with orifices into a series of collector troughs.

The flow is from the collector troughs through a pipe from each trough to an aerated chamber. Oxygen is dissolved in the wastewater by means of an air diffuser piping system in such chamber to maintain the automatic backwash filter (AB filter) in aerobic conditions and to eliminate any possible nitrogen gas carryover.

The flow passes from the aerated channel into the AB filter. Suspended solids will be removed in the AB filter by passing the wastewater downward through a sand or dual media (sand and anthracite) bed. The AB filter is divided up into a series of small cells, each containing the filter media. The flow will be down into the underdrain of each cell and out a port for each cell into a common effluent channel.

Periodically, it is necessary to clean the media in both the biological reactor and the AB filter. The reactor does not actually remove suspended solids, but over time, there may be some accumulation of solids. It may also be necessary to slough off some of the bacterial growth to prevent plugging. The cleaning will be required very infrequently, however, and will be accomplished by a combined air scour/water washing. The washwater will also overflow into the collector troughs, flow to the aerated channel, and then to the AB filter, just as the treated flow does.

The AB Filter is automatically backwashed based on time or headloss. The backwash is initiated by a preset time clock or on the level rising in the tank to a level probe. Once initiated, a traveling bridge backwashing mechanism makes a minimum of one complete pass of the filter, backwashing each cell, and then coming to rest at the other end of the filter tank. The backwash water can be recycled back upstream in the treatment process to the head of the water treatment plant.

The biological reactor uses a fixed-film process for denitrification, as described previously with a high level of biomass accumulation on the media allows a rapid rate of denitrification and a high degree of nitrogen removal.

The denitrification rates are very low with the known combined systems using wastewater as a carbon source, therefore much larger structures are required for the suspended growth reactors and clarifiers. Nitrogen removal with such combined systems is about 10–20% less effective than with the methanol system in accordance with this invention. Current nitrogen removal requirements probably will require a final polishing denitrification step be added to such combined systems. The capital costs for the combined systems can be expected to be much greater than the fixed-film system following a nitrification system. The installed cost differential will increase significantly more if a combined system requires a polishing step.

The new process of the invention provides a more effective denitrification and suspended solids removal rather than trying to accomplish both steps in one tank, as extensively practiced in the prior art. Thus, biological reactors in accordance with the invention can be designed, sized, and include the appropriate media for the most efficient denitrification. Likewise, the AB filter can be sized and include the appropriate media for the most efficient suspended solids removal. Trying to select one design, one design flow rate, and one media to handle two distinctly different processes involves compromising the efficiency of each process.

BRIEF DESCRIPTION OF THE DRAWINGS

A more complete understanding of the invention can be obtained by reference to the accompanying drawings in which:

FIG. 1 is a lateral sectional view of a first embodiment of an improved multi-stage system for tertiary treatment of water for biological denitrification and suspended solids removal in accordance with the invention.

FIG. 7 is a fragmentary, sectional view of a portion of a third embodiment of a system of the invention.

DESCRIPTION OF THE PREFERRED EMBODIMENTS

Figure 2:
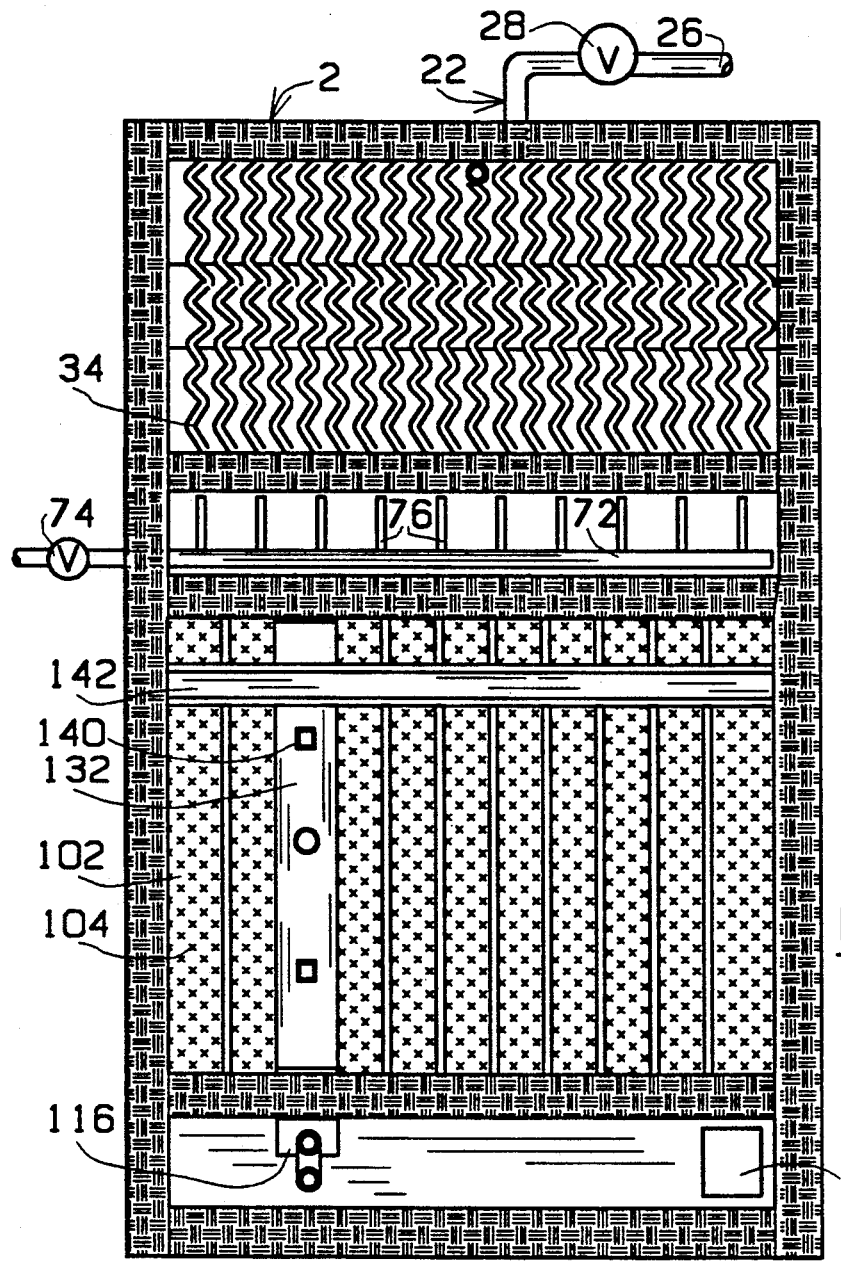
FIG. 2 is sectional view taken on the line II—II of FIG. 1.
Figure 3:
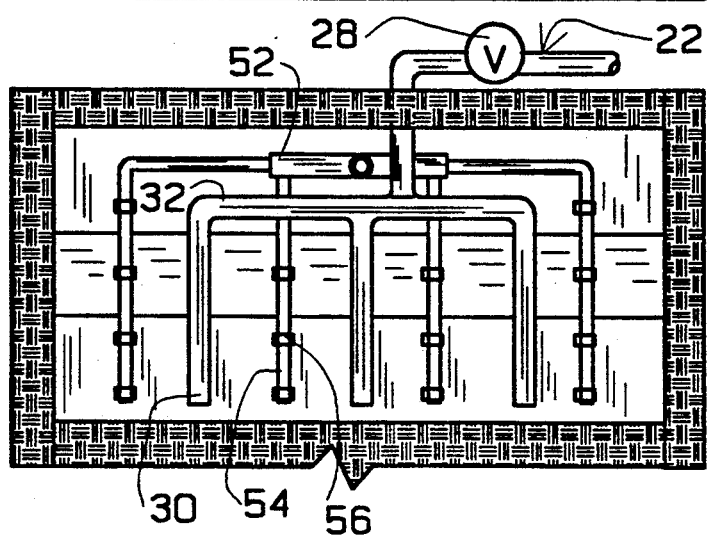
FIG. 3 is sectional view taken on the line III—III of FIG. 1.
Figure 4:
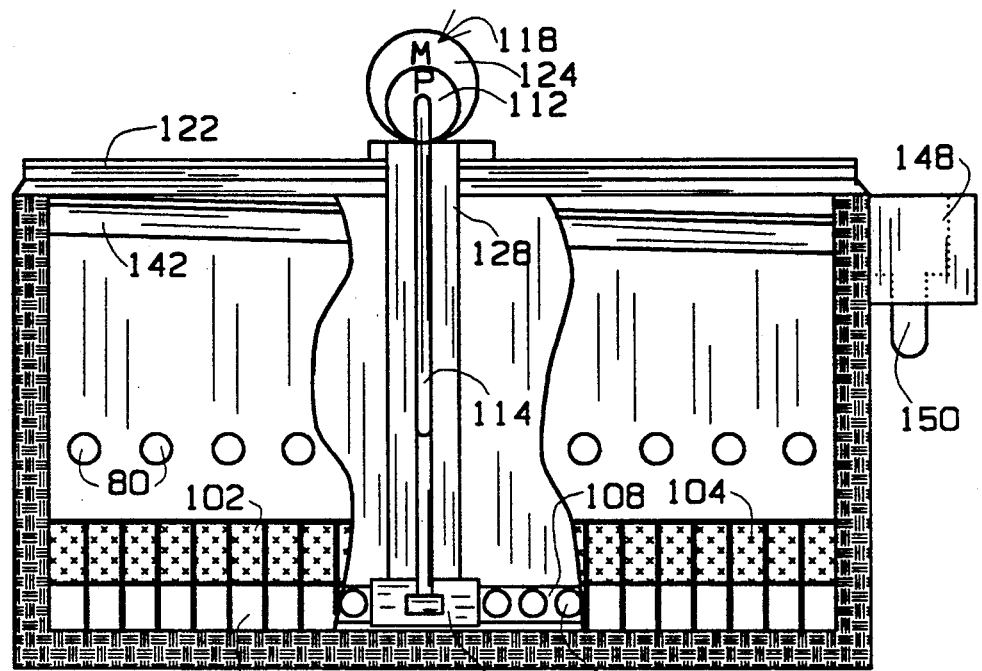
FIG. 4 is sectional view taken on the line IV—IV of FIG. 1.
Figure 5:
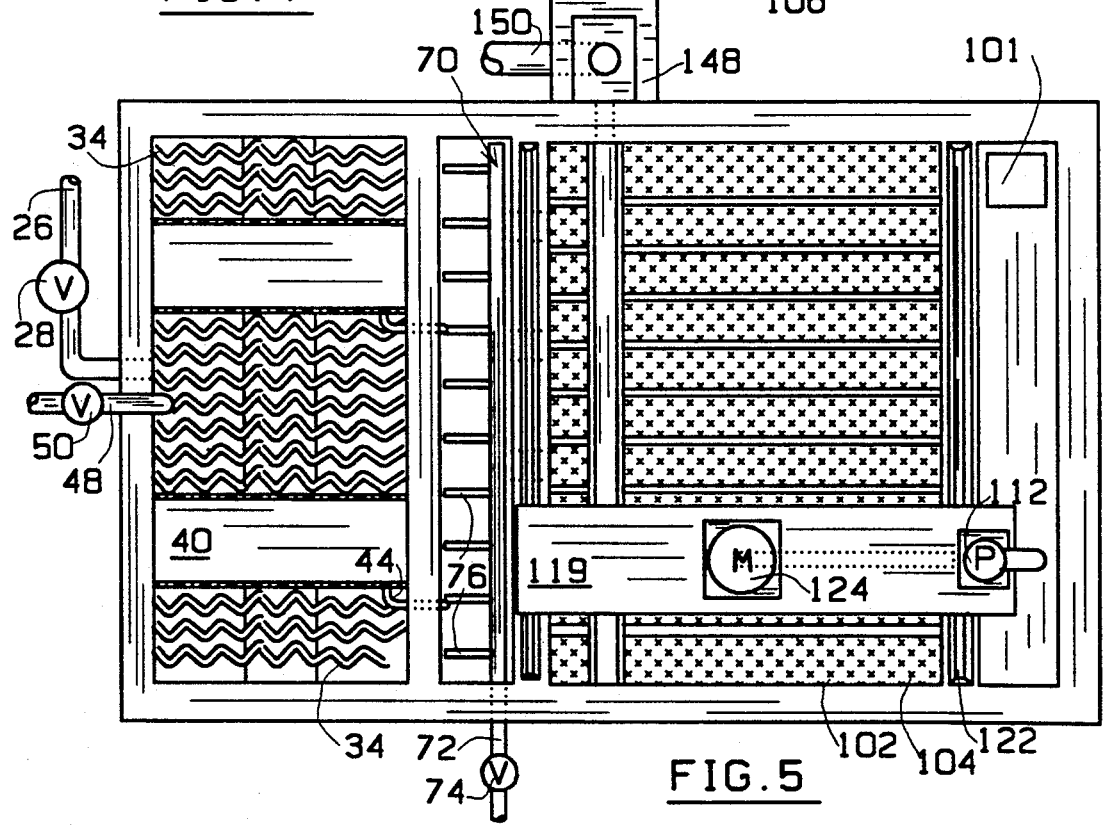
FIG. 5 is sectional view taken on the line V—V of FIG. 1.

Referring in detail to FIGS. 1–6 of the drawings, the improved multi-stage treatment system 2 for biological denitrification of and suspended solids removal from water comprises a biological reactor 4, an aeration chamber 6 and an automatic backwash filter 8.

The reactor 4 includes a tank 9 having a lower tank portion 10, a central tank portion 12 and an upper tank portion 14 defined by a closed tank bottom 16, tank sidewalls 18 and an open tank top 20.

Influent distribution means 22 is positioned in the lower tank portion 10 above the sump 24. Means 22 includes influent line 26, valve 28 and distributors 30 carried on a manifold 32.

Rigid plastic media 34 supporting denitrifying bacterial growths 36 is centrally carried in the tank 9 by cross beams 38. Media 34 preferably consists of corrugated panels of rigid polyvinyl chloride or similar plastic, e.g., BIOdek ® synthetic water treatment media sold by Munters of Fort Myers, Fla.

A plurality of horizontal collector troughs 40 are positioned in the upper tank portion 14 and each one includes at least one notched weir 42 and an outlet pipe 44.

Air scour means 46 comprises inlet pipe 48, valve 50, a manifold 52 carrying a series of tubes 54 each equipped with a plurality of nozzles 56.

The aeration chamber 4 has a lower chamber portion 58, a central chamber portion 60 and an upper chamber portion 62 defined by chamber bottom 64, chamber sidewalls 66 and an open chamber top 68.

Aeration means 70 positioned in the lower chamber portion 58 comprises header pipe 72, valve 74 and lateral spargers 76.

The outlet pipes 44 of the collector troughs 40 discharge into the chamber 4.

Chamber outlet means 78 is associated with the central chamber portion 60 to deliver aerated water (not shown) from chamber 4 into filter 6. In the embodiment of the system 2 shown in FIGS. 1–5, means 78 consist of a series of openings 80 though the sidewall 66a common to chamber 4 and filter 6. Other outlet means 78 may be successfully used in providing water treatment systems of the invention (see FIG. 7), e.g., in place of circular openings 80, an elongated, upper portion of the sidewall 66B can be cut away forming a longitudinal ledge 82 which is combined with a weir plate 84 that is adjustable in height permitting the liquid head existing in chamber 4 to be varied.

Filter 6 is defined by a filter bottom 86, filter sidewalls 88 and an open filter top 90 and has a lower filter portion 92, a central filter portion 94, an upper filter portion 96 and an effluent channel portion 98 defined, in part, by channel sidewalls 99 that contain an effluent discharge line 100. Channel portion 98 contains effluent drain sump 101.

Filter 6 is divided into a plurality of seriate rectangular cells 102 each containing particulate filter media 104 and having separate underdrains 105. There is a separate port 106 in each cell 102 beneath its the filter media 104 communicating with its underdrain 105 for discharging filtered liquid from and charging backwash liquid to the respective the cell 102. The effluent channel portion 98 is common to all the separate ports 106 so that all communicate therewith through a longitudinal planar surface 108 in which the separate ports are substantially equally spaced apart a predetermined distance along a longitudinal axis.

Backwashing means 110 for filter 6 comprises a pump 112, piping 114 and a backwash shoe 116 that slides along the surface 108 and is used to force backwashing liquid through the separate ports 106, one at a time to flow upwardly through the cell 102 associated with its respective port 106. Motor means 118 serves to slide the backwash shoe 116 along the planar surface 108.

Motor means 118 comprises a carriage 119 that travels longitudinally of filter 6 on wheels 120 that run along rails 122 and are rotated by motor 124 via drive means 126.

Backwash shoe 116 is carried by support arm assembly 128 that depends from carriage 119 to move longitudinally therewith. Spring assembly 130 cantilevered from carriage 119 serves to press backwash shoe 116 into tight contact with surface 108.

Backwashing means 110 further includes a horizontal washwater hood 132 defined by a closed top 134, dependent sidewalls 136 and a rectangular open bottom 138, the periphery of bottom 138 being substantially equal to the periphery of one of the rectangular cells 102. Washwater hood 132 is suspended from carriage 119 by columns 140.

The filter 6 additionally includes a washwater trough 142 and the backwashing means 110 includes pump 144 and piping 146 to transfer washwater from the hood 132 into the washwater trough 142 from which it discharges into collector box 148 for transfer via pipe 150 to the treatment plant's primary clarifier (not shown) or to waste.

While the new systems of the invention have been shown and described as having open tops 20, 68, etc., it should be understood that such tops can be closed by covers for either aesthetic or odor control reasons.

In the improved methods of the invention for the multi-stage treatment of influent water with denitrifying bacterial growths 36 supported on the vertically extending rigid media panels 34, methanol is added to the influent water which is charged via line 26 into the reactor 2. As the water flows upwardly in the reactor 2, it contacts the bacterial growths 36 which convert nitrates and nitrites contained therein into nitrogen gas that passes out the top 20 as the water flows over the weirs 42 into the collector troughs 40. The denitrified water then flows into chamber 4 via pipe 44 where it is aerated by air passed through the spargers 76 to produce aerated water containing suspended solids. Such solids are removed from the aerated water to form clarified water by passing it downward through the seriate cells 102 containing particulate filter media 104. The clarified water discharges from the filter 6 via ports 106 into channel portion 98 from which it exits through effluent line 100.

From time to time, the bacterial growths 36 are scoured by injecting air into the influent water contained in tank 9 via the nozzles 56 of the scour means 46.

The particulate filter media 104 is periodically backwashed by forcing washwater seriatim upwardly through individual cells 102 of filter 8. This is accomplished by running pump 112 to force wash water via shoe 116 through ports 106, one at a time. When sufficient wash water has passed upwardly though a given cell 102, the motor 124 causes the carriage 119 to move shoe 116 to the next port 106 so the next cell 102 may be backwashed.

As each cell 102 is backwashed, the hood 132 is positioned by the carriage 119 over that cell. Pump 144 is operated during the backwash cycle so that the wash water leaving the cell being backwashed is withdrawn from the hood 136 and pumped via piping 146 into the trough 142 for discharge into the collector box 148 and pipe 150.

Figure 6:
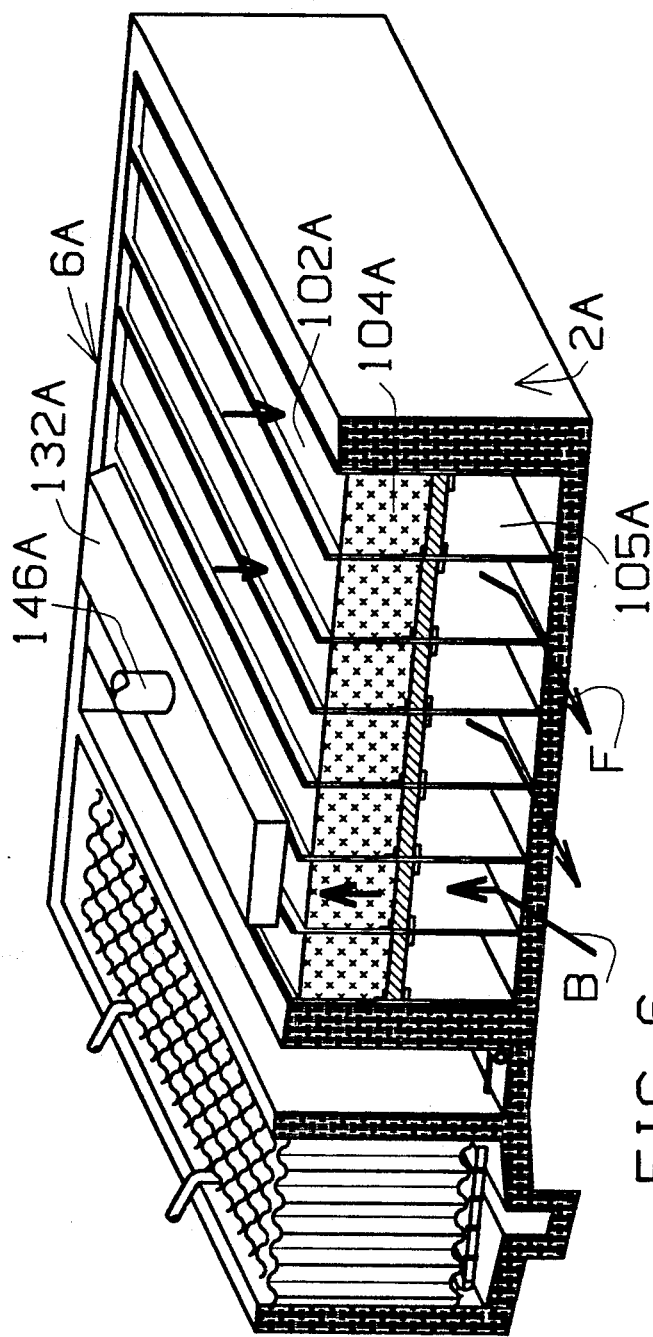
FIG. 6 is an isometric view, partially in section, of a second embodiment of an improved multi-stage system for tertiary treatment of water for biological denitrification and suspended solids removal in accordance with the invention.
Figure 8:
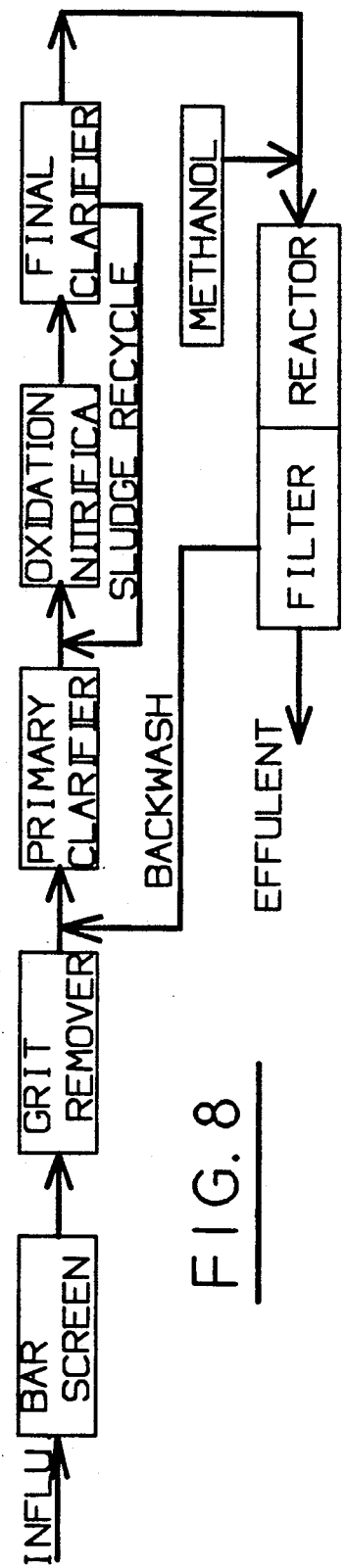
FIG. 8 is a schematic diagram of a typical wastewater treatment plant in which the improvements of the present invention may be incorporated.

The flow of treated water and wash water during the filtration cycle and the backwash cycle of individual filter cells is illustrated by the system 2A shown in FIG. 6. Thus, during the filtration cycle of any cell in filter 6A, treated water flows as indicated by arrows F downward through media 104A in the cells 102A and underdrains 105A. In contrast, when any given cell in filter 6A is in the backwash cycle, wash water in that cell 102A flows upwardly as indicated by arrows B via its underdrain 105A and through media 104A to exit the filter 6A via the hood 132A and piping 146A.

Figure 9:
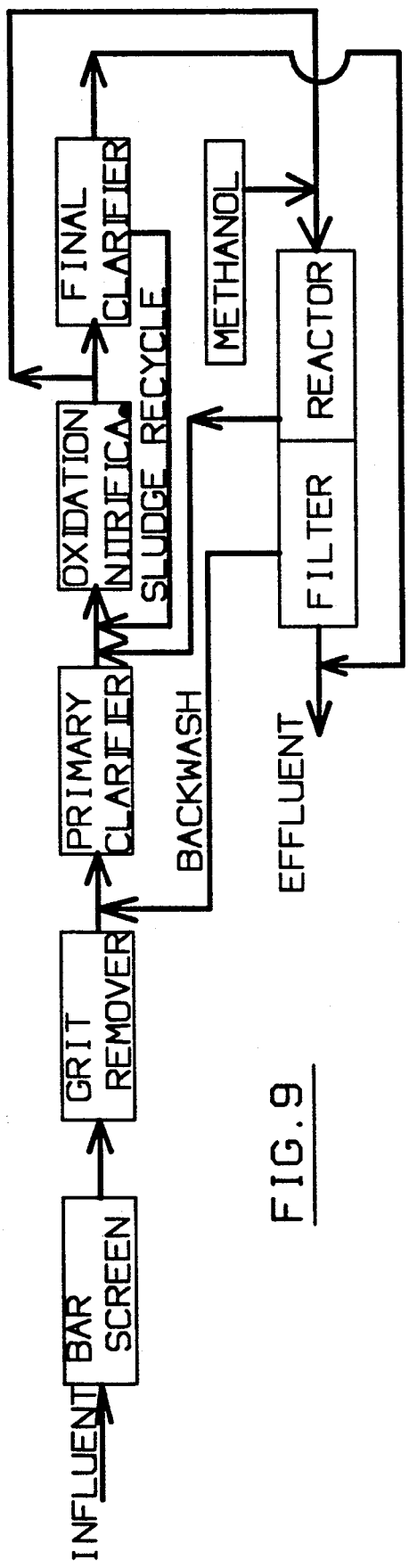
FIGS. 9 and 10 are schematic diagrams of other wastewater treatment plants having different flow schemes, as compared to the plant of FIG. 8, in which the improvements of the present invention may be incorporated.

FIG. 9 shows a flow scheme in a wastewater treatment plant that would be used during the startup phase of a system of the invention to promote the initial formation of biofilm in the reactor. At startup when these is no or little biological film on the fixed media in the reactor, mixed liquor solids would be recirculated from the oxidation-nitrification (ON) basin through the reactor and back to the influent of the ON basin. During this time, it might be desirable to feed calcium, e.g., in the form of lime, to enhance the attachment of the biota to the fixed media. As the amount of the fixed film biota increases, a portion of the recirculating flow from the ON basin can be replaced by effluent from the final clarifier until the entire flow is from the final clarifier effluent. Alternatively, the recirculating flow can be discontinued completely and replaced by the full final clarifier effluent flow.

Figure 10:
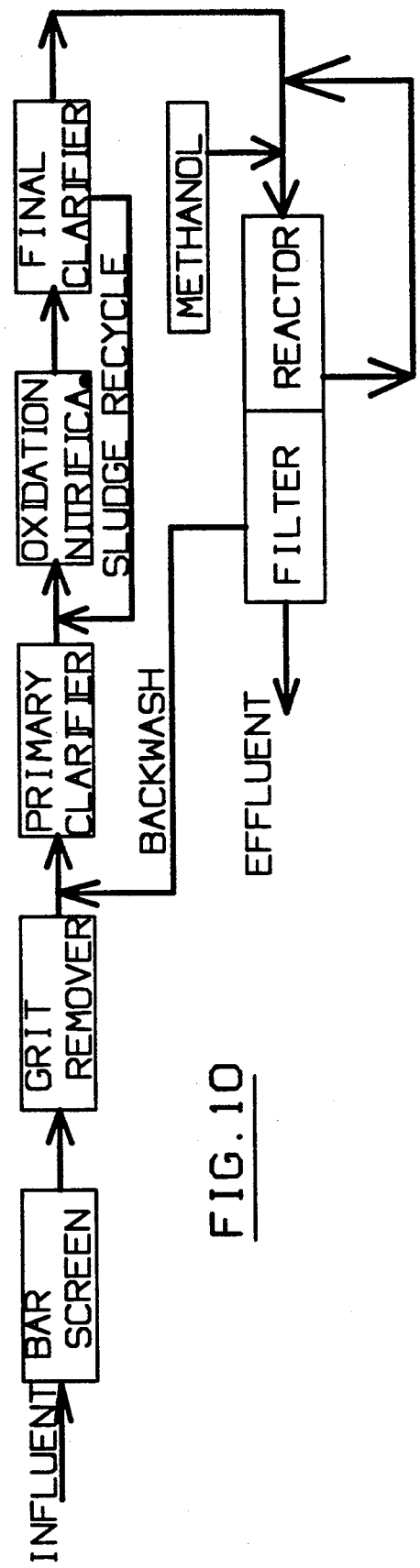

FIG. 10 shows another recirculating scheme that can be used to enhance the performance efficiency of the reactor. During the usual dinaural cycles, the influent flow to a sewage plant can drop to low volumes having an adverse affect on the biota. However, a relatively constant flow can be maintained through the reactor if a recirculating flow from the effluent to the influent of the reactor is employed as a supplement during the periods of low sewage flow. The recirculating flow can be varied either stepwise or continuously. The resulting relatively constant flow provides two benefits, i.e., solids will not settle in the reactor and the biota will remain in an efficient state of activity.

The embodiments of the invention in which an exclusive property or privilege is claimed are defined as follows:

1. An improved method for the multi-stage treatment of influent water for biological denitrification of and suspended solids removal therefrom which comprises:

providing a vertically extending zone containing vertically extending rigid media panels supporting denitrifying bacterial growths, adding carbon source to said influent water, introducing said carbon source containing influent water into said zone so as to flow upwardly therein and contact said denitrifying bacterial growths, removing denitrified water from said zone at a level above said media panels, aerating said denitrified water to produce aerated water containing suspended solids, removing suspended solids from said aerated water to form clarified water by passing it downward through a filter divided into a plurality of seriate rectangular cells containing particulate filter media, and discharging said clarified water from said filter at a level below said cells.

2. The method of claim 1 wherein said bacterial growths are periodically scoured by injecting air into said influent water at a level below said media panels.

3. The method of claim 1 wherein said particulate filter media is periodically backwashed by forcing washwater seriatim upwardly through individual cells of said plurality of seriate rectangular cells.

4. The method of claim 1 wherein said carbon source is methanol.

* * * * *